United States Patent [19]

Dibuz et al.

[11] Patent Number: 4,894,292
[45] Date of Patent: Jan. 16, 1990

[54] THERMOSETTING PHENOLFORMALDEHYDE SHEET MOLDING COMPOSITIONS AND METHOD OF PREPARATION

[75] Inventors: Jeno J. Dibuz, Mercer Island, Wash.; Leland R. Miller, Auburn, Me.

[73] Assignee: Reichhold Chemicals Inc., White Plains, N.Y.

[21] Appl. No.: 888,638

[22] Filed: Jul. 25, 1986

Related U.S. Application Data

[63] Continuation of Ser. No. 733,537, May 13, 1985, abandoned, which is a continuation of Ser. No. 469,452, Feb. 24, 1983, abandoned, which is a continuation-in-part of Ser. No. 381,502, May 24, 1982, abandoned, which is a continuation of Ser. No. 170,167, Jul. 18, 1980, abandoned.

[51] Int. Cl.⁴ ............................................. R29C 39/14
[52] U.S. Cl. .................................... 428/524; 264/166; 264/331.22; 524/35; 524/361; 524/379; 524/425; 524/437; 524/445; 524/446; 524/451; 524/538; 524/596; 524/525
[58] Field of Search ........................... 264/166, 331.22; 524/594, 35, 361, 379, 425, 445, 446, 451, 437, 525, 596, 530, 538; 428/524

[56] References Cited

U.S. PATENT DOCUMENTS

| | | | |
|---|---|---|---|
| 2,168,981 | 8/1939 | Flood et al. | 525/501 |
| 4,075,155 | 2/1978 | Philipps | 524/594 |
| 4,182,701 | 1/1980 | Cottrel | 524/598 |
| 4,198,332 | 4/1980 | Storm | 264/331 |
| 4,626,569 | 12/1986 | Waitkus | 264/331.22 |

Primary Examiner—James Derrington
Attorney, Agent, or Firm—Rodman & Rodman

[57] ABSTRACT

A flexible fibrous reinforced phenol-formaldehyde sheet molding compound capable of rapid curing to an infusible state.

29 Claims, 1 Drawing Sheet

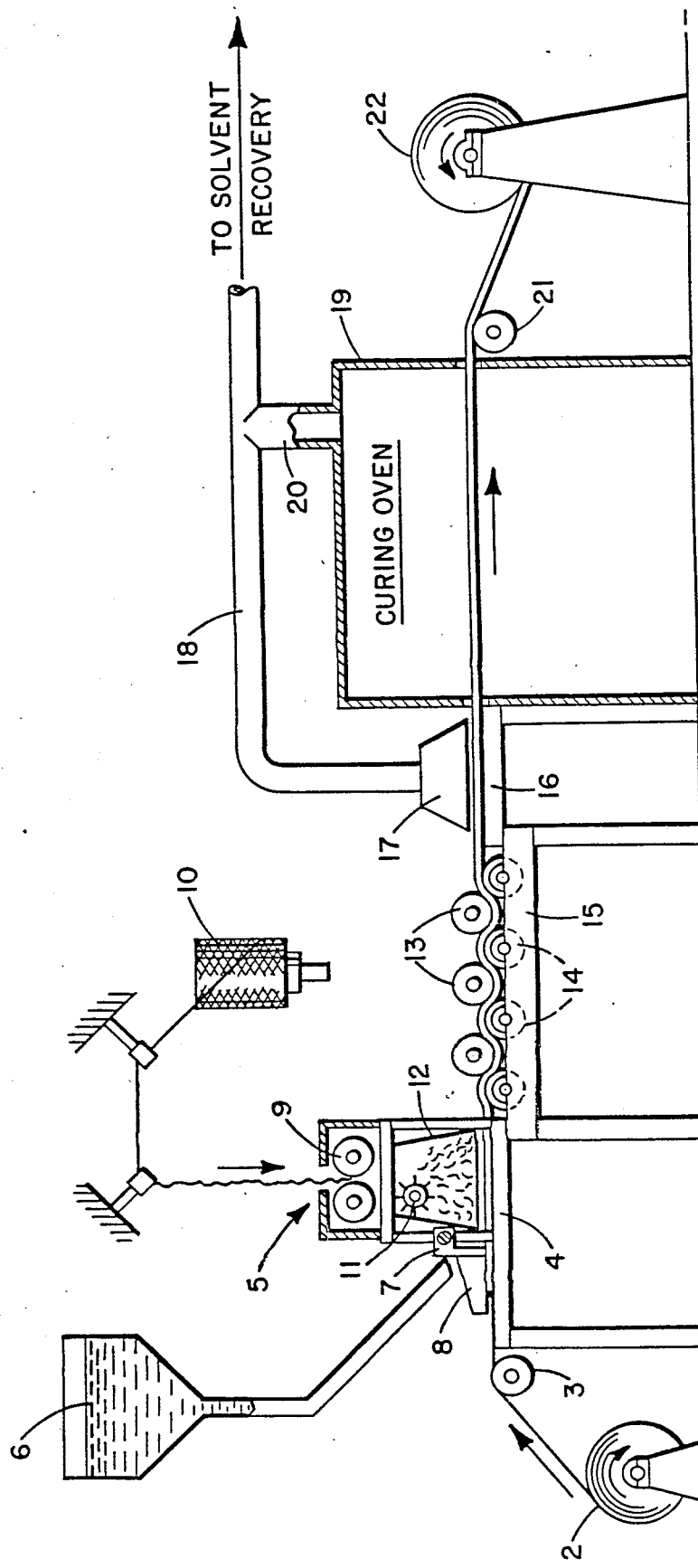

THERMOSETTING PHENOLFORMALDEHYDE SHEET MOLDING COMPOSITIONS AND METHOD OF PREPARATION

This is a continuation application of Ser. No. 733,537 filed May 13, 1985, and now abandoned, which is a continuation application of Ser. No. 06/469,452 filed Feb. 24, 1983, now abandoned; which is a continuation-in-part application of abandoned U.S. application Ser. No. 381,502 filed May 24, 1982; which was a continuation application of U.S. abandoned application Ser. No. 170,167 filed July 18, 1980.

BACKGROUND OF THE INVENTION

The present invention relates to new and improved "B" stage (intermediary) systems of fiber reinforced phenol-formaldehyde sheet molding compositions (SMC), which are sufficiently flexible to be easily and usefully formed and/or moldable into predetermined and desired shapes or use forms.

This invention also relates to the curing of these "B" staged compositions, after forming or fitting into molds where finished products are produced, which exhibit improved physical characteristics such as superior fire retardation, strength, hardness, rigidity, and some flexibility useful for fitting or implacement in areas of construction or use. Also relating to this invention is the formulation of the SMC to be essentially non-shrinking during the curing process.

An advantage to the use of a "B" stage system is in its properties which allows manufacturers to ship and/or store the molding compositions in cohesive sheets, rolls, folds and other forms prior to molding in a separate molding operation into desired cured, rigid articles.

The prior art of simple phenolic molding compounds has a long history. Detailed description of this history can be found in "The Chemistry of Phenolic Resins" by Martin, John Wiley and Sons, Inc., 1956, and its cited references. Also, the "Encyclopedia of Polymer Science and Technology" Vol. 10, John Wiley and Sons, Inc., New York, describes the early history and general uses of phenolic resin based general purpose, high impact strength, heat resistant materials and molding compounds used for special electrical insulation applications. The manufacture of phenolic molding compounds encompasses a hot compounding operation in which phenol-formaldehyde resin is fluxed and intimately mixed with such dry ingredients as hexamethylene tetramine, wood flour, lime, stearic acid and nigrosine. These dry ingredients are preblended and fed to heated rolls where a compounded sheet is formed as the resin melts and in so doing wets and disperses the fillers through the sheet to form a homogeneous mixture of the filler and resin. The warm sheet of compounded resin is cooled, crushed, and ground to the desired particle sizes to form a molding powder for use in compression molding. The molding powder may be poured directly into the mold cavities or may be cold pressed to produce shaped pre-forms which may then be subsequently heat cured to form the finished article.

One U.S. Patent to Kevin M. Foley, et al, No. 3,944,515 discloses a type of fiber reinforced phenolic SMC based upon the incorporation of Portland cement-type material which, upon forming the composition into a predetermined shape such as flat sheet and then thermosetting, produces flat sheets of completely cured hard sheets of considerable flexural strength, flexural modulus, and tensile strength. The phenolic condensate produced has a shelf life sufficiently long, under ordinary conditions, that sheet molding compound produced from it within four hours is satisfactory. The reactive Portland cement present in the composition assists the curing of the resin into an insoluble condition. In the practice of this invention, the mix composition is maintained under heat and pressure in a predetermined molded shape and this shape is maintained while curing it into the finished infusible article.

The art of SMC based on polyester resins (apart from the phenolic kinds) is extensively developed and is particularly exemplified by the disclosures set forth in the U.S. Pat. Nos. 3,975,353; 3,994,853; 3,925,300; and 3,988,290.

The sheet molding compounds (SMC) of the present invention are fibrous reinforced mats impregnated with compositions containing "B" stage (partially polymerized) phenolic resin systems compounded with catalysts, fillers, and other like compounding materials. This composite is formed in a partially curable flexible sheet which can be fabricated or molded by heat and/or pressure into hard, infusible shaped articles.

In the phenolic SMC compositions of this invention, it has been discovered that reactive cementaceous material can be eliminated to provide flexible rather than inflexible "B" stage compositions that can be stored or transported in rolls, flats, or folded shapes prior to the use of the "B" stage compounds in a final molding operation which, by heat and/or pressure the curing of the compounds is effected, thus producing the desired rigid articles.

One of the advantages of the system of this invention is to permit resin formulators to store or ship resin products in cohesive and stable sheet or bulk form to secondary manufacturers for convenient local molding and final curing into infusible final products.

An object of the present invention is to provide a flexible reinforced sheet molding composition (SMC) containing a partially polymerized phenolic resin system that can be stored and shipped in sheets, rolls, or flat folded shapes which, upon molding under heat and/or pressure, can be finally cured to form rigid finished articles.

A further object is to provide a glass fiber reinforced "B" stage sheet molding compositions that upon molding under heat and/or pressure, produce finished articles having excellent surface characteristics, high flexural strength and low flame emission characteristics.

A still further object is to provide a method for forming from phenolic resin systems a "B" stage fiber reinforced sheet molding compound.

Another object is to provide phenolic resin based compositions that contain fibrous reinforcement which may be applied over fiber reinforcing mats in place in a mold.

A still further object is to provide a method of continuously forming flexible, partially cured fiber reinforced sheet molding compounds that can be molded under heat and/or pressure to rigid finished articles.

These and other objects will become apparent from the following description of compositions and the process for forming the sheet molding compounds, together with the examples of the formulation of the composition that is formed into a sheet molding composition and the drawing (FIG. 1) which illustrates a process for forming the sheet molding compositions, in which:

The drawing (FIG. 1) shows a typical diagrammatic illustration of a "B" stage phenolic sheet molding compounding process that may be used to produce the sheet molding compounds typical of this invention.

The drawing illustrates a schematic arrangement for forming the fiber reinforced sheet molding compounds having flexible carrier sheet 1, to aid in handling and storage after "B" stage processing, fed from a supply roll 2 over a tension roller 3. From the tension roller 3 the carrier sheet passes over a support table 4 where, positioned above the outer surface of the carrier sheet, is a liquid resin and fiber supply station 5 for depositing continuously over the surface of the carrier sheet a deposit of the resin followed by a deposit of fibers. The liquid resin may be deposited either in the central portion of the sheet or in a zone a substantial distance inwardly from the edges of the sheet.

The resin and supply station has a resin feed tank 6 which continuously feeds a measured quantity of resin to a doctor blade 7 arrangement equipped with a height adjustment to provide a means for varying the amount of resin applied to the carrier sheet and controlling the thickness of deposit on the carrier sheet 1.

On each side of the doctor blade is a vertical edge plate 8 attached to the outboard ends of the doctor blade, which produces a dam of resin at the downstream edge of the doctor blade and limits in the direction lateral to the movement of the carrier sheet the width of the deposit on the carrier sheet. The resin feed tank 6 may have suitable means for controlling the flow of resin to the doctor blade 7 such as a metering pump, valve, or the like (not shown).

Positioned directly downstream of the doctor blade 7 and directly over the carrier sheet is the fiber supply station of 5 which contains a set of chopping rolls 9 into which is fed fiber roving, such as fiberglass, from a spool or ball 10. The fibers exit from the chopping rolls and are gravity fed and distributed over the width of the resin deposits on the carrier sheet by a distributing roll 11 housed in a funnel-shaped confining member 12 so that the chopped fibers are deposited continuously within a fixed area on the surface of the moving wet layer of resin on the carrier sheet.

The amount of fiber deposited from the chopping rolls is controlled by the speed of the rolls and the number of spools 10 of roving that are fed into the chopping rolls 9. The fibers are continuously deposited in the form of a loose stack which is distributed substantially uniformly across the width of the resin layer and randomly oriented with regard to the travel of the wet resin layer on the carrier sheet.

From the resin and fiber supply station 5, the carrier sheet with resin and fiber deposit is conveyed through one or more sets of parallel spaced apart upper and lower compacting rollers 13, 14 that are positioned lateral to the movement of the carrier sheet and positioned so that the lowermost periphery of an upper roller 13 projects below the uppermost periphery of the lower roller. When more than one set is used the uppermost periphery of the rollers in the upper set 13 project in and between adjacent uppermost periphery of the rollers in the lower set of rollers 14. The set of rollers effects an immersing of the fiber in the surface of the wet resin layer while compacting and compounding the continuous sheet of molding compound to a desired uniform thickness on the carrier sheet.

The top compacting rollers 13 may have roller surface design such as pyramidal points, continuous spiral grooves and lands or segmented rings to aid in the compounding of the fibers in the wet resin. The top rollers 13 may be supported only by the carrier sheet 1 and bear directly upon the surface of the compound, or they may be secured to a machine frame 15 in such a manner that predetermined pressure can be exerted on the surface of the compound to improve wet-out of the fibrous reinforcement by the resin.

From the compacting rolls 13, 14, the carrier sheet passes over a heated horizontal table 16 where a preheating stage of the resin is effected to remove solvent. The solvent from the resin can be collected in a solvent removal hood 17 and passed by conduit 18 to a suitable solvent recovery system, not shown.

The carrier sheet from the preheating stage is then passed through a "B" stage curing oven 19 maintained at a temperature of about 180° F. to about 260° F. where the fiber reinforced phenolic compound is devolatilized with the phenolic resin portion of the compound partially polymerized to form the "B" stage compound. The volatiles driven off the resin film are removed from the oven by a suitable exhaust system 20 which exits into conduit 18 for recovery of the volatiles removed.

Exiting from the oven, the carrier sheet conveys the partially cured "B" stage sheet molding compound over support roller 26 where it is air cooled before it is rolled onto a driven windup roll 22 as finished sheet molding compound supported by a peel-off backup sheet that allows for ease of handling during shipment and fabrication.

The "B" stage sheet molding compounds can be utilized as molded parts in the transportation industry, such as, airlines, buses, trains, ships, as well as in fixed placements, such as, homes, industrial buildings, skyscrapers, etc., where strength, durability, ease of cleaning and increased resistance to ignition and burning from a fire source is important, as well as to provide good surface and required shape characteristics. More specific examples of this sheet molding compound use is in construction of wallboards, furniture, and doors. Their value would be especially predominant in skyscrapers where the fire hazards are more critical.

The "B" stage fiber reinforced sheet molding compound may be formed from a phenol-formaldehyde condensate resin composition which has incorporated therein an inert filler or a mixture of inert fillers such as calcium carbonate, alumina, clay, talc, glass microballoons, and the like.

The total weight of such fillers may be in the range of 0 to 60 percent by weight and preferably in the range of 30 to 50 percent by weight, the range based on the total weight of the sheet molding compound. One function of the incorporated fillers is to provide shrink resistance.

Also, the composition may contain suitable internal lubricants as release agents which are used to provide ease of separation of the product from the mold after final cure. Generally from about 0.5 to about 5.0 percent by weight based upon the molding composition is used. Exemplary of the internal lubricants would be INT-12[1], lecithin oils, blends of mineral oils and waxes, linseed oil, and the like.

[1] Made by Axel Plastic Research Laboratories, 41-14 29th St., Long Island City, N.Y. 11101.

Acetone, $C_1$-$C_3$ alcohols, methyl ethyl ketone, water and mixtures of these may be used as solvents to provide viscosity control of the liquid resin. Other organic solvents may be used that are compatible with the phenolic resin systems and will provide suitable viscosity range when used. About 15 to about 30 percent by weight based upon the weight of the composition is used.

The phenolic resin blend used as the resin component of this invention is prepared from a mixture of phenol-formaldehyde resin solution and a powdered solid phenol-formaldehyde resin. These two resins when blended together form a composition which is superior in performance to either of the resins used alone because a faster cure time is achieved when molding the finished part, the resin saturates and surrounds the reinforcing material more thoroughly and rapidly, the resin achieves better compatibility with the filler, and a decrease in "B" stage time is obtained since less volatiles are required to remove.

If only a phenol-formaldehyde resin solution is used, the system is too slow curing because the level of catalyst must be kept low so as not to produce mold corrosion. Also, when using only a resin solution, the amount of volatile to remove during the "B" stage process of manufacturing the compound is increased to such an extent that drying is extremely difficult and the volatiles if still present create blisters in the molded article. The addition of powdered (solid) resin in combination with the liquid resin is to maintain a lower volatile load as possible yet still be able to uniformly distribute the resin on the fiber matrix reinforcement system.

Likewise, if only a powdered solid resin is used, it is difficult to fill the voids between the reinforcing materials and to coat them with sufficient resin so as to produce a finished molded article which does not have diminished physical properties.

Suitable phenol-formaldehyde solution resins have a molecular weight ratio of formaldehyde-to-phenol ranging from about 1.2 to about 1.8 to 1.0. Solid resins suitable for the invention have a molecular weight ratio of formaldehyde-to-phenol ranging from about 0.6 to about 2.2 to 1.0. A preferred ratio of formaldehyde-to-phenol is in the range of 1.5 to 1.8 to 1.0 for the solution resin and in the range of 0.8 to 1.8 to 1.0 for the solid resin.

The amount of solution phenol-formaldehyde resin and solid resin is in the range of from about 70 to 50 percent by weight solution resin to about 30 to about 50 percent by solid resin based upon the total weight of resin solids used.

The total amount of phenol-formaldehyde resin in the finished molding composition may range from about 25 to about 70 percent by weight and preferably in the range of about 35 to about 65 percent by weight based upon the total weight of the molding composition.

A catalyst is preferably also used in the finished molding composition to assure rapid cure of the phenolic resins and may be selected from those conventially used in the art, with hexamethylene tetramine being preferred. The amount of catalyst used typically ranges from about 0.01 to about 5.0 percent by weight based upon the weight of the finished molding composition.

The fibrous reinforcement component of the system is suitable present in the form of continuous sheet or as random dispersed fibers. Such fibrous reinforcement is well known in the art. The preferred fibrous reinforcing material is glass fiber either in sheet form, woven or nonwoven, based on chopped strands or continuous filaments, or loose chopped strands or fibers. Of equal value are polyaramide, asbestos, and carbonaceous fibers as well as any other cellulosic or synthetic fibrous reinforcing material which will be wet out by and adhere to the phenolic resin. The sheet molding components may contain from 1 to 40 percent by weight and preferably from 20 to 30 percent by weight of fibrous reinforcement based on the total weight of the sheet molding compound.

The composition of the present invention produces fiber reinforced sheet molding compounds having excellent flame retardant properties as measured by laboratory tests without the need of adding extra compounds of known flame retardant properties, such as chlorinated waxes, chlorinated polyethylene, polyvinyl chloride, antimony trioxide, bismuth trioxide, and the like. In the gas emission burning tests, measurements of CO, HCN, HF, HCl, $SO_2$ and $NO_2$ were extremely low. Low smoke emissions were also recorded.

Flexural strength of cured "B" stage fiber reinforced sheet molding compounds averages 15,000 psi and the fleural modulus averages $1 \times 10^6$ psi. These structural performance measurements are within the requirements of the airplane industry. These compounds also provide articles with excellent mechanical properties.

The "B" stage sheet molding compositions of this invention have been found to be a stable in excess of 9 months when stored at 32° to 36° F. The sheet molding compounds were stored at 32° to 36° F. for 18 months, then pressed into a flat panel using a cycle of 10-45 seconds heat treatment at 80-200 psi and 220°-340° F., a 15-60 second breathe period and a 3-7 minute, press at about 500-1000 psi and 280°-350° F. with the result that an excellent molded part was produced.

The phenolic resin compositions of the present invention, the sheet molding compounds prepared therefrom, and general physical characteristics are illustrated in the following examples.

EXAMPLE I

| Resin Mix Formulation | Percent |
| --- | --- |
| Phenol-formaldehyde resin solution A expressed as solids (F/P ratio = 1.5 to 1.8) | 26.2 |
| Phenol-formaldehyde powdered resin B expressed as solids (F/P ratio = 0.7 to 1.00) | 17.4 |
| Ketone and alcohol solvents | 19.9 |
| Water | 6.8 |
| Calcium carbonate | 18.2 |
| Talc | 9.1 |
| Internal lubricant | 1.5 |
| Hexamethylene tetramine | 0.9 |
| | 100.0 |

"B" Stage Mat Formulation

Using a panel production line as shown in the drawing, a film of the above resin mix is laid down (0.017 inch thick-53 grams/sq. ft.) on parchment release paper. This paper was supported by a polyester film for transport through drying ovens. Glass roving (yield 211), chopped to 9/16 inch, was distributed randomly over the resin surface at the rate of 11 gm/sq. ft. This resin film was run under one compactor roll to wet out the glass and over a hot plate set at 200° F. to preheat the resin before entering the oven. The sheet was run through a 35 ft. 4 zone oven with temperatures set at 205°, 205°, 215°, 210° at 4¼ feet per minute. The sheet was wound on an air driven, clutch equipped rewinder. The resulting sheet was extremely tacky. After further drying the SMC for 5 to 9 minutes at 200° F., it had a volatility of 5.0 to 6.0 percent (30' at 125° C.) and was not tacky. Measured glass content was 20.7%.

EXAMPLE II

| Resin Mix Formulation | Percent |
| --- | --- |
| Phenol-formaldehyde resin solution A expressed as solids (F/P ratio = 1.5 to 1.8) | 26.2 |
| Phenol-formaldehyde powdered resin B expressed as solids (F/P ratio = 0.7 to 1.0) | 17.3 |
| Ketone and alcohol solvents | 21.2 |
| Water | 5.4 |
| Calcium carbonate | 18.4 |
| Talc | 9.1 |
| Internal lubricant | 1.4 |
| Hexamethylene tetramine | 0.9 |
| | 100.0 |

"B" Stage Mat Formulation

Using a panel production line as shown in drawing, a film of the above resin mix was laid down 0.015 inch thick (49 gm/sq. ft., or 36 gm solids/sq. ft.) on polyester film. Glass roving, yield 214, chopped to 9/16 inch was distributed randomly on the resin surface at the rate of 14 gm/sq. ft. The resin film was run under two compactor rolls and then over a hot plate set at 200° F. to preheat the resin before entering the ovens. The emerging sheet was run through an 80 feet five zone oven at 7.4 to 8.4 feet per minute. Oven temperatures were 205°, 205°, 235° F. The sheet was wound on an air driven, clutch equipped rewinder. The resulting sheets were dry. Volatiles of the run were 4.9 to 5.6 percent (30 feet at 125° C.). Measured glass content was 27 percent.

Stability Studies

The "B" stage mat produced in this example was stored at 32° to 36° F. for 18 months. Periodically samples were pressed into a flat panel on a laboratory press using a cycle of 30 seconds heat treatment at 100 psi and 320° F., a 45 second breathe period at 0 psi, and 6 minute 15 second press at 1000 psi and 320° F. All parts produced, including the part from material which had been stored 18 months, were of excellent quality.

EXAMPLE III

Resin Mix Formulation

A one phenolic component mix formulation was prepared from the following components calculated as percentage by weight:

| | Percent |
| --- | --- |
| Phenol-formaldehyde resin solution A expressed as solids (F/P ratio = 1.5 to 1.8) | 42.3 |
| Ketone and alcohol solvents | 15.0 |
| Water | 10.9 |
| Calcium carbonate | 18.0 |
| Talc | 9.0 |
| Internal lubricant | 1.4 |
| Hexamethylene tetramine | 3.4 |
| | 100.0 |

"B" Stage Mat Formulation

The above resin was spread evenly at a rate of 53 gm/sq. ft on a treated parchment release paper. Glass roving chopped to 9/16 inch was distributed evenly over the resin at a rate of 11 gm/sq. ft. The glass was wetted out by rolling the surface with a compactor roll. This mat was then momentarily preheated on a hot plate at 200° F. and then oven dried from 13 to 17 minutes at a temperature of approximately 205° F. The resulting sheet had a volatility of 5 to 6 percent (measured at 30' at 125° C.) and was not tacky. The measured glass content was 20.7 percent. These sheets were excellent with good handling properties.

Press/Cure Cycle

The sheet was pressed at 320° F. in a laboratory operation. The cycle consisted of a 20 second heat treatment at 100 psi, a 30 second breathing period, and a 3 minute-40 second press at 1000 psi. The total cycle time was 4 minutes and 30 seconds required to produce a cured panel of only fair quality. Some blistering occurred.

This example shows that a two-component phenol-formaldehyde resin blend is required in order to produce the desired end product. This product is not suitable for the practice of this invention.

EXAMPLE IV

Resin Mix Formulation

A two phenolic component resin mix formulation was prepared from the following components calculated as percent by weight. Mat was formed from this resin using a low level of glass roving.

| | Percent |
| --- | --- |
| Phenol-formaldehyde resin solution A expressed as solids (F/P ratio = 1.5 to 1.8) | 25.5 |
| Phenol-formaldehyde powdered resin B expressed as solids (F/P ratio = 0.7 to 1.0) | 17.3 |
| Ketone and alcohol solvents | 19.6 |
| Water | 6.6 |
| Calcium carbonate | 18.0 |
| Talc | 9.0 |
| Internal lubricant | 1.5 |
| Hexamethylene tetramine | 3.0 |
| | 100.0 |

"B" Stage Mat Formulation

The above resin was spread evenly at a rate of 53 gm/sq. ft. on a treated parchment release paper. Glass roving chopped to 9/16 inch was distributed evenly over the resin at a rate of 11 gm/sq. ft. The glass was wetted out by rolling the surface with a compactor roll. This mat was then oven dried for approximately 5 minutes at approximately 180° F. The resulting sheet was not tacky. These sheets were excellent with good handling properties.

Press/Cure Cycle

The sheet was pressed at 320° F. in a laboratory operation. The cycle consisted of a 20 second heat treatment at 100 psi, a 30 second breathing period, and a 3 minute-40 second press at 1000 psi. The total cycle time was 4 minutes and 30 seconds to produce an excellent panel.

EXAMPLE V

Resin Mix Formulation

A two phenolic component resin mix formulation was prepared from the following components. In this example a solid resin of higher formaldehyde-phenol ratio was used. Also, ethanol instead of acetone was used as a solvent.

|  | Percent |
| --- | --- |
| Phenol-formaldehyde resin solution A expressed as solids (F/P ratio = 1.5 to 1.8) | 25.5 |
| Phenol-formaldehyde powdered resin B expressed as solids (F/P ratio = 1.8 to 2.2) | 17.0 |
| Ketone and alcohol solvents | 19.4 |
| Water | 6.6 |
| Calcium carbonate | 18.0 |
| Talc | 9.0 |
| Internal lubricant | 1.5 |
| Hexamethylene tetramine | 3.0 |
|  | 100.0 |

"B" Stage Mat Formulation

The above resin was spread evenly at a rate of 53 gm/sq. ft. on a treated parchment release paper. Glass roving chopped to 9/16 inch was distributed evenly over the resin at a rate of 11 gm/sq. ft. The glass was wetted out by rolling the surface with a compactor roll. This mat was then oven dried until the surfaces were non-tacky.

Press/Cure Cycle

The sheet was pressed at 320° F. in a laboratory operation. The cycle consisted of a 20 second heat treatment at 100 psi, a 30 second breathing period, and a 3 minute-40 second press at 1000 psi. The total cycle time was 4 minutes and 30 seconds required to produce a cured panel of excellent quality. No blistering occurred.

EXAMPLE VI

Resin Mix Formulation

A two phenolic component resin mix formulation was prepared from the following components calculaed as percent by weight. Mat was formed from this resin using a low lever of chopped Kevlar 49 Aramid[2] high modulus organic fiber (polyaramide fiber).
[2] Made by DuPont Company

|  | Percent |
| --- | --- |
| Phenol-formaldehyde resin solution A expressed as solids (F/P ratio = 1.5 to 1.8) | 25.5 |
| Phenol-formaldehyde powdered resin B expressed as solids (F/P ratio = 0.7 to 1.0) | 17.0 |
| Ketone and alcohol solvents | 19.6 |
| Water | 6.6 |
| Calcium carbonate | 18.0 |
| Talc | 9.0 |
| Internal lubricant | 1.5 |
| Hexamethylene tetramine | 3.0 |
|  | 100.0 |

"B" Stage Mat Formulation

The above resin was spread evenly at a rate of 53 gm/sq. ft. on a treated parchment release paper. Kevlar chopped to ½ inch was distributed evenly over the resin at a rate of 6 gm/sq. ft. The Kevlar was wetted out by rolling the surface with a compactor roll. This mat was then oven dried for approximately 5 minutes at approximately 180° F. The resulting sheet was not tacky. These sheets were excellent with good handling properties.

Press/Cure Cycle

The sheet was pressed at 320° F. in a laboratory operation. The cycle consisted of a 20 second heat treatment at 100 psi, a 40 second breathing period, and a 6 minute press at 1000 psi. The total cycle time was 7 minutes to produce excellent discs.

EXAMPLE VII

In this example, comparative smoke density and toxicity rating tests were made of a conventional polyester type sheet molding compound, commonly used in the airplane industry versus the phenolic type sheet molding compound of the present invention. Table 1 gives the test data on this experiment.

TABLE 1

| Comparison of Polyester vs. Phenolic SMC | | |
| --- | --- | --- |
| Test Description | Polyester, ppm[c] | Phenolic, ppm |
| Optical smoke[a] density | 107 | 8 |
| Toxicity[b] HCN | 0 | 1 |
| NO$_x$ | 0 | 0 |
| CO | 390 | 100 |
| CO$_2$ | 2667 | 1400 |
| HCl | 22 | 0 |
| HF | 0 | 0 |
| HBr | 2 | 0 |

Footnotes to Table 1
[a]The smoke emission was determined in an Aminco Smoke Chamber #4-4800A. A typical smoke emission maximum allowable limit in the airplane industry is 50, expressed as calculated optical density (D$_s$).
[b]Definitions of toxicity emissions:
HCN = hydrocyanic acid
NO$_x$ = various nitrogen oxides
CO = carbon monoxide
CO$_2$ = carbon dioxide
HCl = hydrochloric acid
HF = hydrochloric acid
HBr = hydrobromic acid
[c]ppm = parts per million concentration.

The toxic gas emissions from the smoke chamber as described in (a) were sampled by means of National/Drager gas detector tubes.

Some present maximum allowable toxic gas emissions in the airplane industry are as follows: CO$_2$, 3500 ppm; HCN, 150 ppm; HF, 50 ppm; HCl, 500 ppm; CO, 100 ppm; NO$_2$, 100 ppm.

The liquid phenol-formaldehyde resin, including solvents and inorganic fillers if desired, is blended with the required amount of powdered solid phenol-formaldehyde resin to form a viscous mixture. It is important to note that no reaction (i.e. thickening) is intended to take place between the inorganic filler or fillers and the resins. Likewise, no reaction takes place between the liquid and powdered solid phenol-formaldehyde resins at this time.

The use of divalent base materials which have been used in the prior art to thicken liquid phenol-formaldehyde resins is not required and is not part of this invention. Such prior divalent base thickening agents may be used merely as inorganic fillers.

As can be seen from the example and the discussion of the invention, a flexible fibrous reinforced phenol-formaldehyde "B" stage sheet molding compound in sheet form capable of rapid curing to an infusible state can be made from a compound formed from a mixture of (A) a resin composition formed from a blend of liquid and solid phenol-formaldehyde resinous components with the components containing from about 30 to about 70 percent expressed by weight resin solids of a phenol-formaldehyde condensate resin blend comprising a water soluble phenol-formaldehyde resin solution having a formaldehyde-to-phenol ratio within the range of from about 1.2 to about 1.8 to 1.0 part and a solid phenol-formaldehyde resin having a formaldehyde-to-phenol ratio within the range of from about 0.6 to about 2.2 to 1.0 wherein the said liquid resin composition is not thickened by the use of a divalent base thickening agent; from about 15 to about 30 percent by weight of a miscible organic solvent; from 15 to about 60 percent by weight of an inert filler; from about 0.5 to about 5.0 percent by weight of an internal lubricant; and from about 0.5 to about 5.0 percent by weight of a catalyst capable of rapidly polymerizing the phenol-formaldehyde condensate resin; and (B) from about 1 to about 50 percent by weight of fibrous reinforcing material based on the weight of the sheet molding compound; with the said sheet molding compound being in a partially cured moldable state with the fibers dispersed therein.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. A flexible fibrous reinforced "B" stage phenol-formaldehyde sheet molding composition in the form of a flexible sheet and capable of rapid curing to an infusible state, said composition formed in the absence of cementaceous material or a reactive divalent base thickening agent, from a mixture consisting essentially of:
   (a) a resin composition containing from about 30 to about 70 weight percent resin solids of a phenol-formaldehyde condensate resin blend comprising a water soluble phenol-formaldehyde resin solution having a formaldehyde-to-phenol ratio of about 1.2–1.8:1.0, and a solid phenol-formaldehyde resin having a formaldehyde-to-phenol ratio of about 0.6–2.2:1.0;
   (b) about 15 to 30 percent by weight of a miscible organic solvent;
   (c) from about 20 to about 40 percent by weight of an inert filler;
   (d) from about 0.5 to about 5.0 percent by weight of an internal lubricant;
   (e) from about 0.5 to about 5.0 percent by weight of a catalyst capable of polymerizing the phenol-formaldehyde condensate resin; and
   (f) from about 1 to about 50 percent by weight of a fibrous reinforcing material based on the weight of the sheet molding composition; said composition being in the form of a flexible sheet in a partially cured non-tacky moldable state with the fibrous material dispersed therein, and having stable properties for several months when stored at temperatures of about 32° to 36° F.

2. A flexible fibrous reinforced "B" stage phenol-formaldehyde sheet molding composition in the form of a sheet and capable of rapid curing to an infusible state, said composition formed from a mixture consisting of:
   (a) a resin composition containing from about 30 to about 70 weight percent resin solids of a phenol-formaldehyde condensate resin blend comprising a water soluble phenol-formaldehyde resin solution having a formaldehyde-to-phenol ratio of about 1.2–1.8:1.0 and a solid phenol-formaldehyde resin having a formaldehyde-to-phenol ratio of about 0.6–2.2:1.0;
   (b) up to about 30 percent by weight of a miscible organic solvent;
   (c) from 20 to about 40 percent by weight of an inert filler selected from the group consisting of calcium carbonate, alumina, clay, talc, glass microspheres, and mixtures thereof;
   (d) from about 0.5 to about 5.0 percent by weight of an internal lubricant;
   (e) from about 0.5 to about 5.0 percent by weight of a catalyst capable of polymerizing the phenol-formaldehyde condensate resin; and
   (f) from about 1 to about 50 percent by weight of a fibrous reinforcing material based on the weight of the sheet molding composition; said composition being in the form of a sheet and in a partially cured non-tacky moldable state with the fibrous material dispersed therein.

3. A method of forming a flexible fibrous reinforced "B" stage phenol-formaldehyde sheet molding composition capable of rapid curing consisting of:
   (a) forming a resin composition of from about 30 to about 70 weight percent resin solids from a phenol-formaldehyde condensate resin blend comprising a phenol-formaldehyde resin solution having a formaldehyde-to-phenol ratio within the range of about 1.2–1.8:1.0, and a solid phenol-formaldehyde resin having a formaldehyde-to-phenol ratio of from about 0.6–2.2:1.0; up to about 30 percent by weight of a miscible organic solvent; from about 20 to about 40 percent by weight of an inert filler; from about 0.5 to about 5.0 percent by weight of an internal lubricant; and from about 0.5 to about 5.0 percent by weight of a catalyst capable of rapidly polymerizing the phenol-formaldehyde condensate resin;
   (b) depositing said resin composition in sheet form on a support backing to a desired thickness;
   (c) distributing randomly over the surface of said resin from about 1 to about 40 percent by weight of fibrous reinforcing material based upon the weight of the sheet molding compound,
   (d) passing said resin sheet with said fibrous reinforcing material through a compacting operation;
   (e) passing said fibrous reinforced resin sheet through a heating zone to partially cure the sheet to form a nontacky, flexible "B" stage sheet molding composition; and
   (f) removing said partially cured sheet molding composition from the heating zone.

4. A method of forming a flexible fibrous reinforced "B" stage phenol-formaldehyde sheet molding composition in the form of a flexible sheet in the absence of cementaceous material or a reactive divalent base thickening agent, capable of rapid curing, and having stable properties for several months when stored at temperatures of about 32° to 36° F., consisting essentially of:
   (a) forming a resin composition of from about 30 to about 70 weight percent resin solids from a phenol-formaldehyde condensate resin blend comprising a phenol-formaldehyde resin solution having a formaldehyde-to-phenol ratio within the range of about 1.2–1.8:1.0, and a solid phenol-formaldehyde resin having a formaldehyde-to-phenol ratio of from about 0.6–2.2:1.0; up to about 30 percent by weight of a miscible organic solvent; from about 20 to about 40 percent by weight of an inert filler; from about 0.5 to about 5.0 percent by weight of an internal lubricant; and from about 0.5 to about 5.0 percent by weight of a catalyst capable of rapidly polymerizing the phenol-formaldehyde condensate resin;

(b) depositing said resin composition in sheet form on a support backing to a desired thickness;

(c) distributing randomly over the surface of said resin from about 1 to about 40 percent by weight of fibrous reinforcing material based upon the weight of the sheet molding compound, (d) passing said resin sheet with said fibrous reinforcing material through a compacting operation;

(e) passing said fibrous reinforced resin sheet through a heating zone to partially cure the sheet to form a nontacky, flexible "B" stage sheet molding composition; and (f) removing said partially cured sheet molding composition in the form of a sheet from the heating zone.

5. The sheet molding composition of claim 1, wherein the catalyst is hexamethylene tetramine.

6. The sheet molding composition of claim 1, wherein the inert filler is selected from the group consisting of calcium carbonate, alumina, clay, magnesium oxide, talc, glass microspheres, and mixtures thereof.

7. The sheet molding composition of claim 1, wherein the fibrous reinforcing material is selected from the group consisting of glass, carbonaceous fibers, polyaramide fibers, cellulosic fibers, and organic fibers.

8. The sheet molding composition of claim 1, having a removable support backing selected from the group consisting of paper and a flexible plastic film having a high degree of resistance to cohesion with said sheet molding composition.

9. The sheet molding composition of claim 1, wherein said fibers are polyaramide.

10. The sheet molding composition of claim 1, wherein the fibers are carbonaceous fibers.

11. The sheet molding composition of claim 1, wherein the fibers are glass fibers.

12. The sheet molding composition of claim 1, wherein said organic solvent is selected from the group consisting of acetone, $C_1$–$C_3$ alcohols, methyl ethyl ketone, water, and mixtures thereof.

13. A fibrous, reinforced, molded article formed from the sheet molding composition of claim 1 under heat curing conditions.

14. The molded article of claim 3, wherein the heat curing conditions include compression.

15. The composition of claim 1, wherein the partially cured sheet molding composition has a volatility of about 5–6%.

16. The method of claim 3, wherein the catalyst is hexamethylene tetramine.

17. The method of claim 3, wherein the inert filler is selected from the group consisting of calcium carbonate, alumina, clay, magnesium oxide, talc, glass microspheres, and mixtures thereof.

18. The method of claim 3, wherein the fibrous reinforcing material is selected from the group consisting of glass fibers, carbonaceous fibers, polyaramide fibers, cellulosic fibers, and organic fibers.

19. The method of claim 3, wherein the sheet molding composition is contacted to a removable support backing selected from the group consisting of paper and a flexible plastic film having a high degree of resistance to cohesion with said molding composition.

20. The method of claim 3, wherein the fibers are polyaramide fibers.

21. The method of claim 3, wherein the fibers are carbonaceous fibers.

22. The method of claim 3, wherein the fibers are glass fibers.

23. The method of claim 3, wherein the sheet molding composition is contacted with the fibrous reinforcing materials in the form of a mat immersed in the resin composition.

24. The method of claim 3, wherein the sheet molding composition is continuously formed on a removable backing sheet.

25. The method of claim 3, wherein the heating zone is maintained at a temperature of about 180° F. to 260° F. during the partial heat curing step.

26. A fiber reinforced molded article formed by the method of claim 3.

27. The method of claim 3, wherein the sheet molding composition is heated to produce a residual volatility of about 5 to 6%.

28. The sheet molding composition of claim 1, wherein the fibrous reinforcing material varies from about 20 to about 40% by weight of said sheet molding composition.

29. The method of claim 3, wherein the fibrous reinforcing material varies from about 20 to about 40% by weight of said sheet molding composition.

* * * * *

UNITED STATES PATENT AND TRADEMARK OFFICE
CERTIFICATE OF CORRECTION

PATENT NO. : 4,894,292

DATED : January 16, 1990

INVENTOR(S) : Dibuz et al.

It is certified that error appears in the above-identified patent and that said Letters Patent is hereby corrected as shown below:

At column 2, line 21, change "curable" to --cured--.

At column 2, line 46, change "provide a glass" to --provide glass--.

At column 5, line 14, change "remove" to --be removed--.

At column 5, line 44, after "by" insert --weight--.

At column 5, line 56, change "toabout" to --to about--.

At column 7, line 28, before "235°F" insert --235°, --.

At column 9, line 36 change "calculaed" to --calculated--.

In claim 14, line 1
   at column 13, line 46, change "3" to --13--.

Signed and Sealed this

Fifth Day of March, 1991

*Attest:*

HARRY F. MANBECK, JR.

*Attesting Officer*     *Commissioner of Patents and Trademarks*